US012599917B2

(12) United States Patent
Chen et al.

(10) Patent No.: US 12,599,917 B2
(45) Date of Patent: Apr. 14, 2026

(54) SHOWER HEAD CAPABLE OF BEING RAPIDLY ASSEMBLED

(71) Applicant: Kylin Sanitary Technology (Xiamen) Co., Ltd., Xiamen City (CN)

(72) Inventors: Zhibin Chen, Xiamen City (CN); Qingshuang Li, Xiamen City (CN); Denghui Bai, Xiamen City (CN); Xijie Deng, Xiamen City (CN)

(73) Assignee: Kylin Sanitary Technology (Xiamen) Co., Ltd., Xiamen City (CN)

( * ) Notice: Subject to any disclaimer, the term of this patent is extended or adjusted under 35 U.S.C. 154(b) by 368 days.

(21) Appl. No.: 18/337,087

(22) Filed: Jun. 19, 2023

(65) Prior Publication Data

US 2024/0390921 A1 Nov. 28, 2024

(30) Foreign Application Priority Data

May 24, 2023 (CN) ......................... 202310593600.2

(51) Int. Cl.
*B05B 1/18* (2006.01)
*B05B 1/16* (2006.01)

(52) U.S. Cl.
CPC .............. *B05B 1/18* (2013.01); *B05B 1/1654* (2013.01)

(58) Field of Classification Search
CPC ......... B05B 1/18; B05B 1/1654; B05B 1/185; B05B 1/16; Y02A 20/40
See application file for complete search history.

(56) References Cited

FOREIGN PATENT DOCUMENTS

| | | | | |
|---|---|---|---|---|
| CN | 202951581 U | | 5/2013 | |
| WO | WO-2014079337 A1 | * | 5/2014 | ............... B05B 1/18 |

* cited by examiner

*Primary Examiner* — Qingzhang Zhou
(74) *Attorney, Agent, or Firm* — Cooper Legal Group, LLC

(57) ABSTRACT

Disclosed is a shower head capable of being rapidly assembled, including a body assembly, a water division assembly and a surface cover assembly. The body assembly includes a body; the water division assembly includes a water tilting body; the water tilting body is provided with a clamping groove and a telescopic locking and retaining part; the surface cover assembly is provided with a clamping portion rotatably clamped to the clamping groove; the locking and retaining part is provided with a locking portion and a blocking portion; the body assembly is provided with a locking and fitting portion, wherein the locking portion is in corresponding fit with the locking and fitting portion to limit rotation of the water division assembly relative to the body; and the blocking portion limits the clamping portion in the clamping groove.

20 Claims, 9 Drawing Sheets

SHOWER HEAD CAPABLE OF BEING RAPIDLY ASSEMBLED

CROSS-REFERENCE TO RELATED APPLICATION

This application claims priority to Chinese Patent Application 202310593600.2. filed on May 24, 2023, which is incorporated herein by reference.

TECHNICAL FIELD

The present invention relates to the technical field of shower heads, and particularly relates to a shower head capable of being rapidly assembled.

BACKGROUND

According to a shower head with a detachable surface cover disclosed by a Chinese patent with the publication number CN202951581U at present, when the surface cover thereon is mounted, the surface cover is pressed to rotate after clamping jaws of the surface cover are flush with clamping grooves of a water tilting body; when the surface cover and the water tilting body rotate anticlockwise together first till the water tilting body rotates to a limiting position and is stationary relative to a body, the surface cover can rotate anticlockwise continuously relative to the water tilting body, so that the surface cover can be assembled after the clamping jaws are clamped and limited by the clamping grooves. According to the device, in the rotating process, the surface cover and the water tilting body cannot be rapidly and stably assembled in position thanks to a relatively long total rotating stroke of the surface cover, which makes the surface cover be separated and fall off, resulting in damage or injury of personnel. The operating convenience and the safe reliability of the assembling process need to be improved.

SUMMARY

The objective of the present invention is to provide a shower head capable of being rapidly assembled, to solve the technical problems.

To achieve the above objective, the technical solution of the present invention is as follows: a shower head capable of being rapidly assembled, including a body assembly, a water division assembly and a surface cover assembly, wherein the body assembly includes a body provided with an assembly chamber; the water division assembly is rotatably mounted in the assembly chamber and comprises a water tilting body and a water division body arranged on an inner side of the water tilting body; the water tilting body is provided with a clamping groove; the surface cover assembly includes a surface cover, wherein the surface cover is provided with a clamping portion, and the clamping portion is rotatably clamped to the clamping groove, so that the surface cover assembly is detachably mounted on the water division assembly; the water tilting body can be provided with a locking and retaining part in a telescopic manner in a position corresponding to the clamping groove, wherein the locking and retaining part is provided with a locking portion and a blocking portion; the body assembly is provided with a locking and fitting portion, wherein the locking portion is in correspondingly fit with the locking and fitting portion to limit rotation of the water division assembly relative to the body; and the blocking portion is configured to limit the clamping portion in the clamping groove so as to limit rotation of the surface cover assembly relative to the water division assembly.

In an embodiment, the clamping portion and the locking and retaining part are configured such that when the clamping portion is in fit with the blocking portion of the locking and retaining part in an extruding manner, the locking an d retaining part retracts, so that the locking portion is in corresponding locking fit with the locking and fitting portion; and when the clamping portion rotates to be separated from the blocking portion of the locking and retaining part, the locking and retaining part retreats, so that the blocking portion limits the clamping portion in the clamping groove, and thus, the surface cover assembly is rapidly mounted on the water division assembly.

In an embodiment, the locking and fitting portion is an arc-shaped latch strip arranged on the body; the locking portion is a latch head; and the latch head is in clamping and limiting fit with the arc-shaped latch strip.

In an embodiment, the body is provided with an unlocking part in a telescopic manner; and the unlocking part and the locking and retaining part are configured such that when the unlocking part drives the locking and retaining part to retract, the locking portion of the locking and retaining part is in corresponding locking fit with the locking and fitting portion, and the blocking portion of the locking and retaining part relieves limitation to the clamping portion in the clamping groove.

In an embodiment, upper and lower sides of the blocking portion are respectively provided with a blocking convex surface and a yielding concave surface; the unlocking part is in driving fit with the yielding concave surface; and the blocking convex surface is configured to limit the clamping portion in the clamping groove to limit rotation of the surface cover assembly relative to the water division assembly.

In an embodiment, an inner side of the water tilting body is provided with a plurality of retaining slotted holes; the assembly chamber of the body is provided with elastic columns in corresponding fit with the retaining slotted holes to achieve water delivery gear switching and voice reminding; and the unlocking part is a button, and when a water delivery gear is located at an initiating end, the locking and retaining part is located between the locking and fitting portion and the button for unlocking fit.

In an embodiment, the shower head capable of being rapidly assembled further includes an elastic resetting part, wherein a position of the water tilting body corresponding to the clamping groove is provided with an upper accommodation groove; a position of the water division body corresponding to the clamping groove is provided with a lower accommodation groove; the upper accommodation groove and the lower accommodation groove are spliced to form an accommodation groove; and the locking and retaining part is arranged in the accommodation groove in a telescopic manner through the elastic resetting part.

In an embodiment, the surface cover assembly further includes a water delivery body; the water tilting body, the water delivery body and the surface cover fit each other to form a first annular water delivery channel, a second annular water delivery channel and a third annular water delivery channel distributed from inside to outside in sequence; an inner ring bump is formed between the first annular water delivery channel and the second annular water delivery channel corresponding to the water tilting body; an outer ring bump is formed between the second annular water delivery channel and the third annular water delivery channel corresponding to the water tilting body; the water delivery body is provided with an inner ring assembly groove and an outer ring assembly groove; the inner ring assembly groove is in seal fit with the inner ring bump; the outer ring assembly groove is in seal fit with the outer ring bump; and the surface cover is provided with a plurality of exhaust holes communicated with the inner ring assembly groove and the outer ring assembly groove.

In an embodiment, there are a plurality of clamping grooves formed at a peripheral edge of the water tilting body, the clamping portion is a clamping jaw, and there are a plurality of clamping jaws arranged at a peripheral edge of the surface cover; and each of the clamping grooves includes an inlet groove and a limiting groove in an "L" shape, the locking and retaining part is arranged at a bottom of the inlet groove in a telescopic manner, and the clamping jaws and the limiting grooves are limited in a clamped manner.

In an embodiment, a top of the blocking portion is a first tilted surface, a bottom of the clamping jaw is a second tilted surface, and the first tilted surface is in corresponding fit with the second tilted surface.

The present invention has the following beneficial effects:

the shower head capable of being rapidly assembled provided by the present invention includes the body assembly, the water division assembly and the surface cover assembly. The body assembly includes the body provided with the assembly chamber; the water division assembly is rotatably mounted in the assembly chamber and includes the water tilting body and the water division body arranged on an inner side of the water tilting body; the water tilting body is provided with the clamping groove; the surface cover assembly includes the surface cover, wherein the surface cover is provided with the clamping portion, and the clamping portion is rotatably clamped to the clamping groove, so that the surface cover assembly is detachably mounted on the water division assembly; the water tilting body can be provided with the locking and retaining part in a telescopic manner in a position corresponding to the clamping groove, wherein the locking and retaining part is provided with the locking portion and the blocking portion; the body assembly is provided with the locking and fitting portion, wherein the locking portion is in corresponding fit with the locking and fitting portion to limit rotation of the water division assembly relative to the body; and the blocking portion is configured to limit the clamping portion in the clamping groove so as to limit rotation of the surface cover assembly relative to the water division assembly. According to the device, in the rotating process, the surface cover and the water tilting body cannot be rapidly and stably assembled in position thanks to a relatively long total rotating stroke of the surface cover, which makes the surface cover be separated and fall off, resulting in damage or injury of personnel. The operating convenience and the safe reliability of the assembling process need to be improved.

Figure 1:
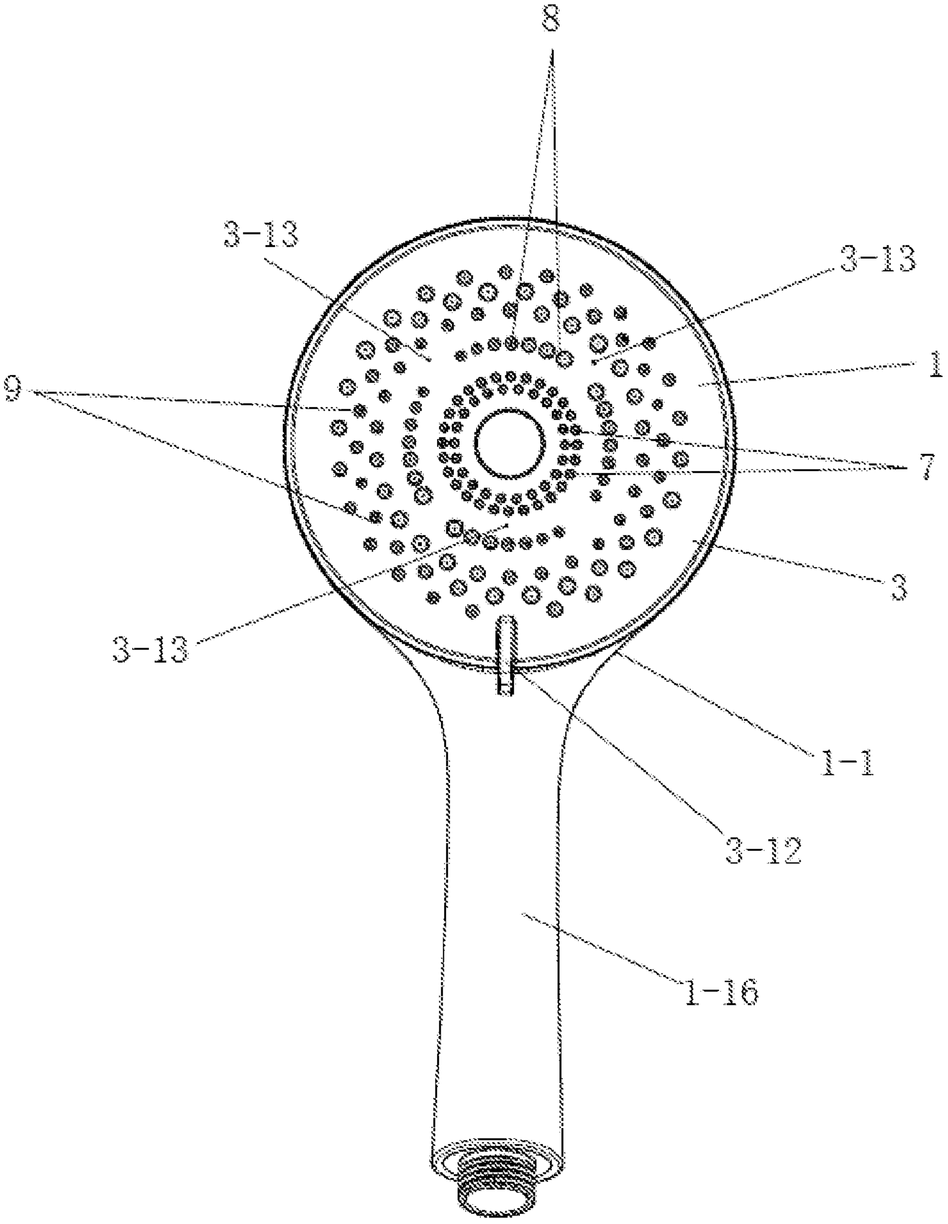
FIG. 1 is a front view of an embodiment of the present invention.
Figure 2:
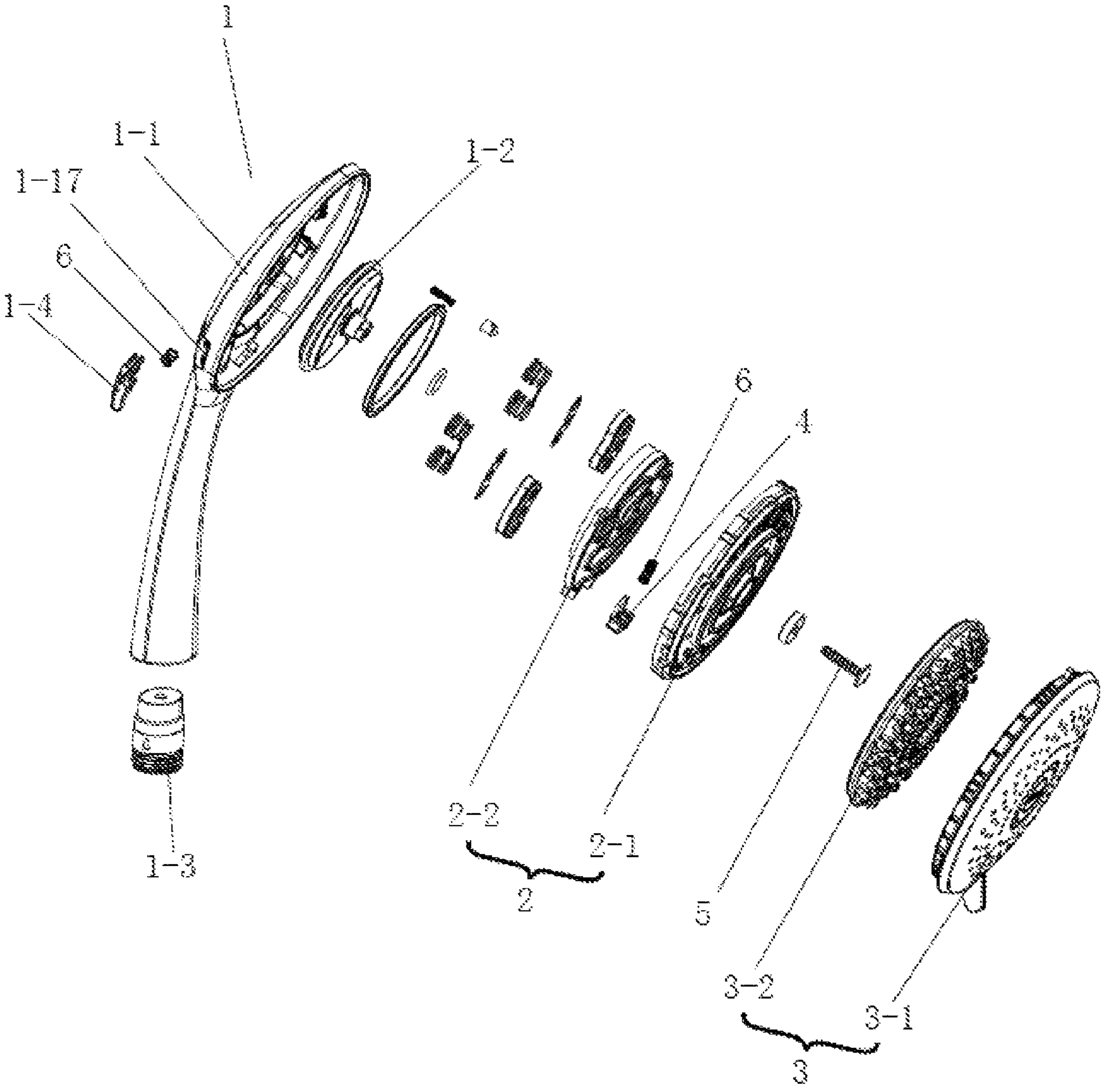
FIG. 2 is an exploded schematic diagram of an embodiment of the present invention.
Figure 3:
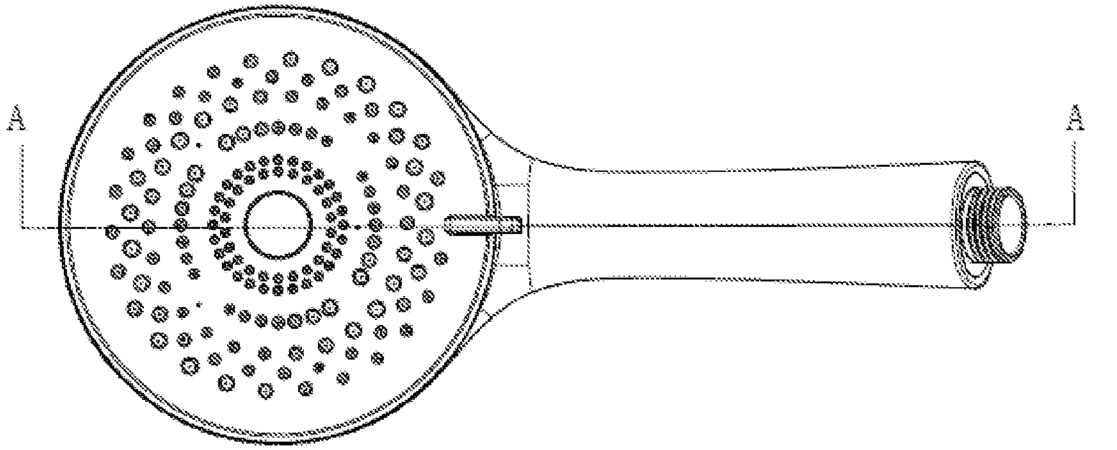
FIG. 3 is an external schematic diagram (I) of an embodiment of the present invention.
Figure 4:
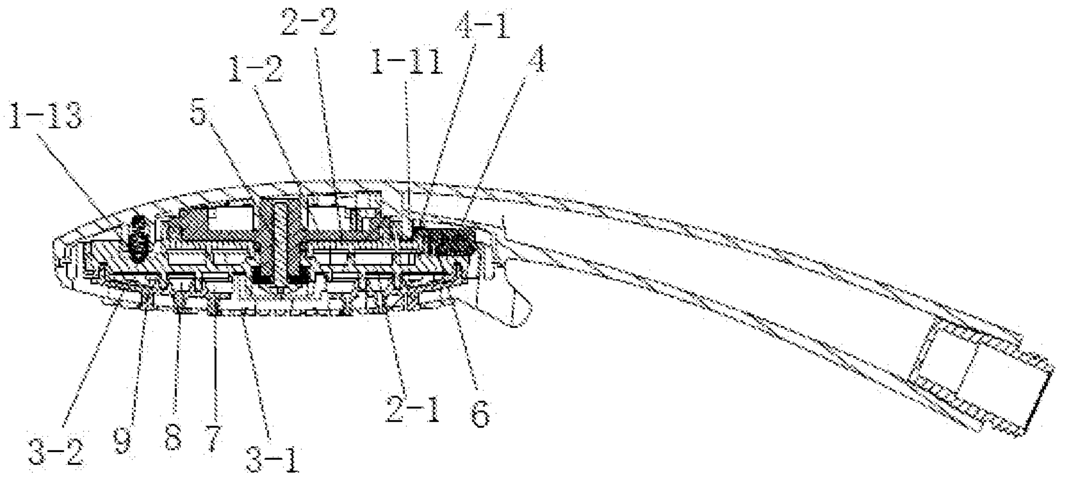
FIG. 4 is a section view of A-A in FIG. 3.
Figure 5:
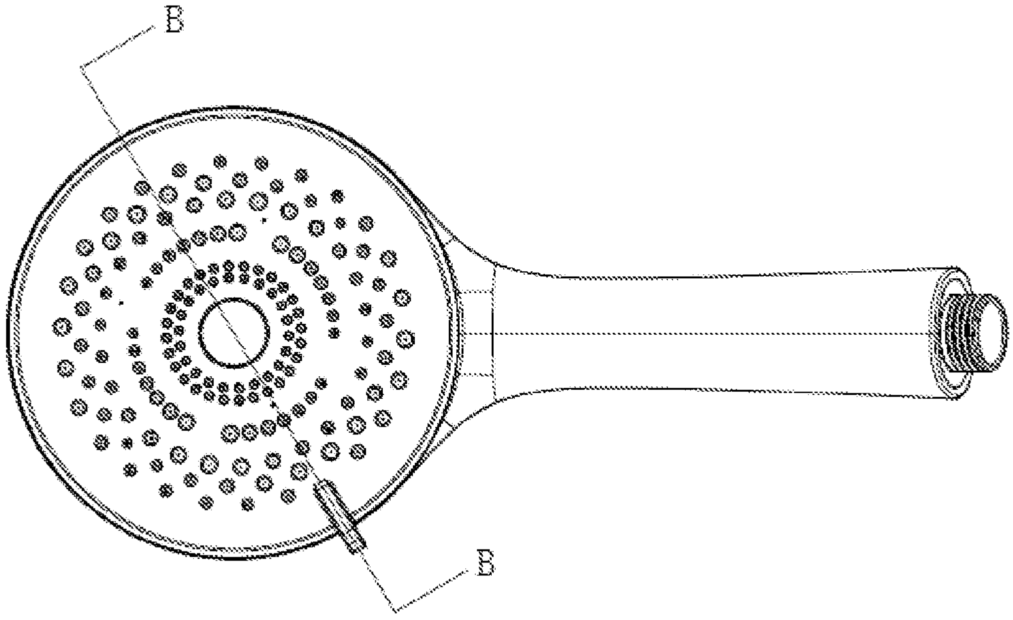
FIG. 5 is an external schematic diagram (II) of an embodiment of the present invention.
Figure 6:
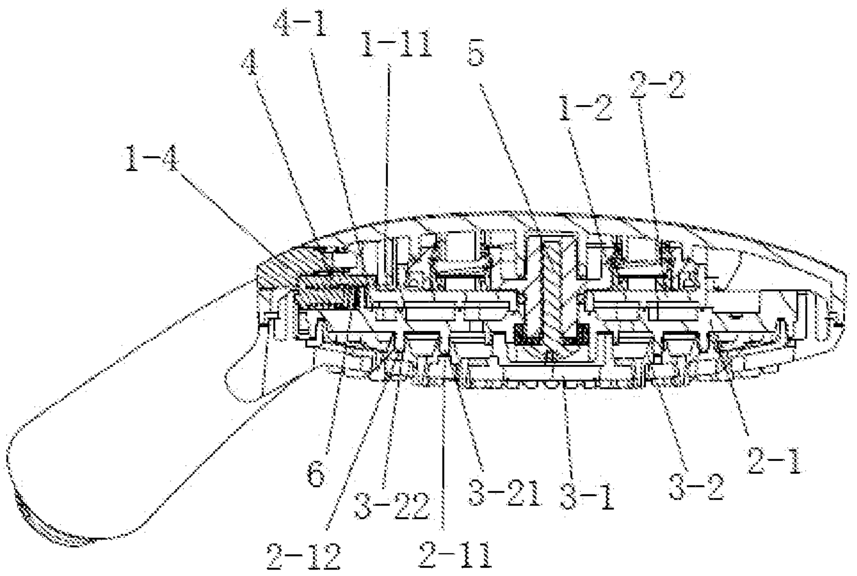
FIG. 6 is a section view of B-B in FIG. 5.

Numerals in the drawings: 1, body assembly; 1-1, body; 1-11, locking and fitting portion; 1-12, support column; 1-13, elastic column; 1-14-support frame; 1-15, assembly chamber; 1-16, handle end; 1-17, button hole; 1-2, fixed seat; 1-3, threaded joint; 1-4, unlocking part; 1-41, button surface; 2, water division assembly; 2-1, water tilting body; 2-11, inner ring bump; 2-12, outer ring bump; 2-13, clamping groove; 2-131-inlet groove; 2-132, limiting groove; 2-14, arrow mark; 2-15, retaining groove hole; 2-16, arc-shaped guide groove; 2-2, water division body; 2-3, accommodation groove; 2-31, upper accommodation groove; 2-32, lower accommodation groove; 3, surface cover assembly; 3-1, surface cover; 3-11, clamping jaw; 3-111, second tilted surface; 3-12, switching handle; 3-13, exhaust hole; 3-2, water delivery body; 3-21, inner ring assembly groove; 3-22, outer ring assembly groove; 4, locking and retaining part; 4-1, locking portion; 4-2, blocking portion; 4-21, first tilted surface; 4-22, third tilted surface; 4-23, blocking convex surface; 4-24, yielding concave surface; 5, screw; 6, spring; 7, first annular water delivery channel; 8, second annular water delivery channel; and 9, third annular water delivery channel.

DESCRIPTION OF EMBODIMENTS

To further describe the embodiments, the present invention is provided with drawings. These drawings are a part of contents disclosed by the present invention, are mainly used for describing the embodiments and can be matched with related description of the description to explain the operation principles of the embodiments. Referring to these contents, those of ordinary skill shall understand other possible embodiments and advantages of the present invention. Components in the drawings are not drawn in proportion, and similar component symbols are usually used for representing similar components.

As shown in FIGS. 1-15, as an embodiment of the present invention, provided is a shower head capable of being rapidly assembled, including a body assembly 1, a water division assembly 2 and a surface cover assembly 3, wherein the body assembly 1 includes a body 1-1 provided with an assembly chamber 1-15; the water division assembly 2 is rotatably mounted in the assembly chamber 1-15 and includes a water tilting body 2-1 and a water division body 2-2 arranged on an inner side of the water tilting body 2-1; the water tilting body 2-1 is provided with a clamping groove 2-13; the surface cover assembly 3 includes a surface cover 3-1, wherein the surface cover 3-1 is provided with a clamping portion which is specifically a clamping jaw 3-11; the clamping jaw 3-11 is rotatably clamped to the clamping groove 2-13, so that the surface cover assembly 3 is detachably mounted on the water division assembly 2; the water tilting body 2-1 can be provided with a locking and retaining part 4 in a telescopic manner in a position corresponding to the clamping groove 2-13, wherein the locking and retaining part 4 is provided with a locking portion 4-1 and a blocking portion 4-2; the body assembly 1 is provided with a locking and fitting portion 1-11, wherein the locking portion 4-1 is in correspondingly fit with the locking and fitting portion 1-11 to limit rotation of the water division assembly 2 relative to the body 1-1; and the blocking portion 4-2 is configured to limit the clamping jaw 3-11 in the clamping groove 2-13 so as to limit rotation of the surface cover assembly 3 relative to the water division assembly 2.

The clamping portion and the locking and retaining part 4 configured such that when the clamping portion is in fit with the blocking portion 4-2 of the locking and retaining part 4 in an extruding manner, the locking an d retaining part 4 retracts, so that the locking portion 4-1 is in corresponding locking fit with the locking and fitting portion 1-11; and when the clamping portion rotates to be separated from the blocking portion 4-2 of the locking and retaining part 4, the locking and retaining part 4 retreats, so that the blocking portion 4-2 limits the clamping portion in the clamping groove 2-13, and thus, the surface cover assembly 3 is rapidly mounted on the water division assembly 2.

According to the above technical solution, when the surface cover assembly 3 is covered and mounted, the clamping jaw 3-11 of the surface cover 3-1 is flush with the clamping groove 2-13 of the water tilting body 2-1 and the surface cover is pressed downwards, and the clamping jaw 3-11 is in extruding fit with the blocking portion 4-2, so that the locking and retaining part 4 retracts, the locking portion 4-1 is in corresponding locking fit with the locking and fitting portion 1-11 to limit rotation of the water division assembly 2 relative to the body assembly 1; thus, the surface cover assembly 3 is capable of rotating anticlockwise relative to the water division assembly 2, extruding fit of the clamping jaw 3-11 and the blocking portion 4-2 is relieved till the clamping jaw 3-11 is rotatably clamped to the clamping groove 2-13 in position; the locking and retaining part 4 retreats, so that the blocking portion 4-2 limits the clamping jaw 3-11 in the clamping groove 2-13, and thus, the surface cover assembly 3 is rapidly assembled on the water division assembly 2; at this time, fit of the locking portion 4-1 and the locking and fitting portion 1-11 is relieved, and the water division assembly 2 can rotate relative to the body assembly 1; specifically, by rotating the surface cover assembly 3, the surface cover assembly 3 and the water division assembly 2 rotate together relative to the body assembly 1, so that various water delivery gears are switched and adjusted. When the surface cover assembly 3 is assembled, the total rotating stroke thereof is short, guaranteeing that the surface cover 3-1 and the water tilting body 2-1 are rapidly and stably assembled in position, preventing unnecessary damage or injury of personnel as the surface cover 3-1 is separated and falls off in the rotating process, and improving the operating convenience and the safe reliability of the assembling process.

In the embodiment, the body assembly 1 further includes a fixed seat 1-2 and a threaded joint 1-3. The fixed seat 1-2 and the water division assembly 2 both penetrate through a screw 5 at the center thereof and are mounted in an assembly chamber 1-15 of the body 1-1. The threaded joint 1-3 is mounted and locked at a handle end 1-16 of the body 1-1, and is configured to be connected to a water inlet pipe (not shown in the drawings). The fixed seat 1-2 is fixedly arranged relative to the body 1-1. The water division assembly 2 is rotatably arranged relative to the fixed seat 1-2. The locking and fitting portion 1-11 is an arc-shaped latch strip arranged on the body 1-1, the locking portion 4-1 is a latch head, and the latch head is in clamping and limiting fit with the arc-shaped latch strip. The device guarantees that the limiting process is more accurate and stable. Of course, under other circumstances, the arc-shaped latch strip can further be arranged on a peripheral outer side of the fixed seat 1-2.

In the embodiment, the body 1-1 is provided with an unlocking part 1-4 in a telescopic manner; and the unlocking part 1-4 and the locking and retaining part 4 are configured such that when the unlocking part 1-4 drives the locking and retaining part 4 to retract, the locking portion 4-1 of the locking and retaining part 4 is in corresponding locking fit with the locking and fitting portion 1-11, and the blocking portion 4-2 of the locking and retaining part 4 relieves limitation to the clamping jaw 3-11 in the clamping groove 2-13.

When the surface cover assembly 3 needs to be detached, the surface cover assembly 3 is only rotated, so that the surface cover assembly 3 and the water division assembly 2 rotate clockwise together. The unlocking part 1-4 is operated till the locking and retaining part 4 rotates to a position in corresponding fit with the unlocking part 1-4, so that the unlocking part 1-4 drives the locking and retaining part 4 to retract, so that the locking portion 4-1 is in corresponding locking fit with the locking and fitting portion 1-11 to limit rotation of the water division assembly 2 relative to the body assembly 1. Meanwhile, the blocking portion 4-2 of the locking and retaining part 4 relieves limitation to the clamping jaw 3-11 in the clamping groove 2-13, and the surface cover assembly 3 is continuously rotated clockwise, so that the surface cover assembly 3 is operated to rotate clockwise relative to the water division assembly 2, and the surface cover assembly 3 can be detached and taken out till the clamping jaw 3-11 screws out of the clamping groove 2-13.

Specifically, upper and lower sides of the blocking portion 4-2 are respectively provided with a blocking convex surface 4-23 and a yielding concave surface 4-24; the unlocking part 1-4 is in driving fit with the yielding concave surface 4-24; and the blocking convex surface 4-23 is configured to limit the clamping jaw 3-11 in the clamping groove 2-13 to limit rotation of the surface cover assembly 3 relative to the water division assembly 2. According to the device, when the unlocking part 1-4 is in driving fit with the yielding concave surface 4-24, it drives the locking and retaining part 4 to retract, so that the blocking convex surface 4-23 relives limitation to the clamping jaw 3-11 in the clamping groove 2-13, and meanwhile, the unlocking part 1-4 will not cause blocking interference to the clamping jaw 3-11, so that the clamping jaw 3-11 can smoothly screw out of the clamping groove 2-13.

In the embodiment, an inner side of the water tilting body 2-1 is provided with a plurality of retaining slotted holes 2-15, the plurality of retaining slotted holes 2-15 are formed in an arc shape, and an arc-shaped guide groove 2-16 is formed between every two adjacent retaining slotted holes 2-15; the assembly chamber 1-15 of the body 1-1 is provided with elastic columns 1-13, the arc-shaped guide groove 2-16 is configured to slidably guide each of the elastic columns 1-13, the elastic columns 1-13 are in corresponding fit with the retaining slotted holes 2-15 to achieve water delivery gear switching and voice reminding. Specifically, the depth of the retaining slotted holes 2-15 is greater than that of the arc-shaped guide groove 2-16, so that when the elastic columns 1-13 fall into the retaining slotted holes 2-15, a sound will be generated due to elastic contact for water delivery gear switching reminding.

In the embodiment, the unlocking part 1-4 is a button and is arranged at the peripheral outer side of the body 1-1 in a telescopic manner through a spring 6. When the water delivery gear is at an initiating end, the locking and retaining part 4 is located between the locking and fitting portion 1-11 and the button, i.e., the button is arranged relative to the left end of the arc-shaped latch strip for achieving unlocking fit; when the surface cover assembly 3 needs to be detached, the surface cover assembly 3 is only rotated, so that the surface cover assembly 3 and the water division assembly 2 rotate clockwise together to the initiating end (i.e., the left end of the rotating stroke) of the water delivery gear, and at this time, the locking and retaining part 4 rotates to a position in corresponding elastic limiting fit with the unlocking part 1-4. By pressing the button, the button pushes the locking and retaining part 4 to retract, so that the blocking portion 4-2 relives limitation to the clamping portion (the clamping jaw 3-11) in the clamping groove 2-13; then the surface cover assembly 3 rotates clockwise continuously, so that the water division assembly 2 can be detached from the surface cover assembly 3. According to the device, when the surface cover assembly 3 is detached, it is only rotated to the left end, and at the initiating end of the water delivery gear, voice reminding for unlocking in position can be achieved as the elastic columns 1-13 are in corresponding elastic limiting fit with the retaining groove holes 2-15, so that the button is accurately aligned with the locking and retaining part 4, and thus, it is rapidly detached conveniently.

In the embodiment, a button hole 1-17 is formed in the peripheral outer side of the body 1-1. The button is arranged in a telescopic manner in the button hole 1-17 through the spring 6. An outer end surface of the button protrudes out of the button hole 1-17 of the body 1-1 to form a button surface 1-41. The button surface 1-41 and the body 1-1 are consistent in shape of outer surface, i.e., the button surface 1-41 and the body 1-1 form an integral whole in shape, guaranteeing that the whole shower head is more harmonious and attractive and normal use of the shower head is not hindered.

Of course, the unlocking part 1-4 can be arranged in any position of the body 1-1, and the form thereof is not limited to the button, for example, a sliding plate, as long as it can drive the locking and retaining part 4 to retract.

In the embodiment, the shower head further includes an elastic resetting part, specifically the spring 6. A position of the water tilting body 2-1 corresponding to the clamping groove 2-13 is provided with an upper accommodation groove 2-31; a position of the water division body 2-2 corresponding to the clamping groove 2-13 is provided with a lower accommodation groove 2-32; the upper accommodation groove 2-31 and the lower accommodation groove 2-32 are spliced to form an accommodation groove 2-3; and the locking and retaining part 4 is arranged in the accommodation groove 3 in a telescopic manner through the spring 6. The spring 6 is configured to drive the locking and retaining part 4 to retract and reset. According to the arrangement, the locking and retaining part 4 is more easily assembled on the water division assembly 2 with high acting stability.

As shown in FIGS. 4, 6, 9 and 10, in the embodiment, the surface cover assembly 3 further includes a water delivery body 3-2 mounted on the inner side of the surface cover 3-1; the water tilting body 2-1, the water delivery body 3-2 and the surface cover 3-1 fit each other to form a first annular water delivery channel 7, a second annular water delivery channel 8 and a third annular water delivery channel 9 distributed from inside to outside in sequence; the surface cover assembly 3 and the water division assembly 2 are controlled to rotate relative to the body 1-1 to adjust various water delivery modes for users to select; there are specifically five water delivery modes which are respectively inner ring shower head water, inner ring shower head water+inner ring shower head water, inner ring shower head water+central ring shower head water+outer ring shower head water, outer ring shower head water+central ring shower head water, and outer ring shower head water; the inner ring shower head water, the central ring shower head water and the outer ring shower head water are respectively delivered by the first annular water delivery channel 7, the second annular water delivery channel 8 and the third annular water delivery channel 9; an inner ring bump 2-11 is formed between the first annular water delivery channel 7 and the second annular water delivery channel 8 corresponding to the water tilting body 2-1; an outer ring bump 2-12 is formed between the second annular water delivery channel 8 and the third annular water delivery channel 9 corresponding to the water tilting body 2-1; the water delivery body 3-2 is provided with an inner ring assembly groove 3-21 and an outer ring assembly groove 3-22; the inner ring assembly groove 3-21 is in seal fit with the inner ring bump 2-11; the outer ring assembly groove 3-22 is in seal fit with the outer ring bump 2-12, which guarantees that water in the first annular water delivery channel 7, the second annular water delivery channel 8 and the third annular water delivery channel 9 will not interflow, thereby guaranteeing stable water delivery. The water delivery body 3-2 is made from a highly elastic material which can be a silica gel or rubber, so that the sealing effect is guaranteed.

In the embodiment, the surface cover 3-1 is provided with a plurality of exhaust holes 3-13 communicated with the inner ring assembly groove 3-21 or the outer ring assembly groove 3-22; the exhaust holes 3-13 are configured to exhaust and relieve pressure of the surface cover assembly 3 so as to prevent difficult detachment of the surface cover assembly 3 mounted on the water division assembly 2 with high pressure and high absorbability, thereby guaranteeing that the surface cover assembly 3 is more smooth and labor-saving to detach.

In the embodiment, there are a plurality of clamping grooves 2-13 formed at a peripheral edge of the water tilting body 2-1; there are a plurality of clamping jaws 3-11 arranged at a peripheral edge of the surface cover 3-1, the clamping jaws 3-11 are in one-to-one correspondence to the clamping grooves 2-13, and the clamping jaws 3-11 and the clamping grooves 2-13 have two different structures, guaranteeing more accurate counter-position mounting. According to the above arrangement, the arranging areas of the water delivery channels are larger, so that the effective water delivery areas of the water division assembly 2 and the surface cover assembly 3 are improved, the structural layout is optimized, and the shower head is assembled more firmly and stably.

Figure 7:
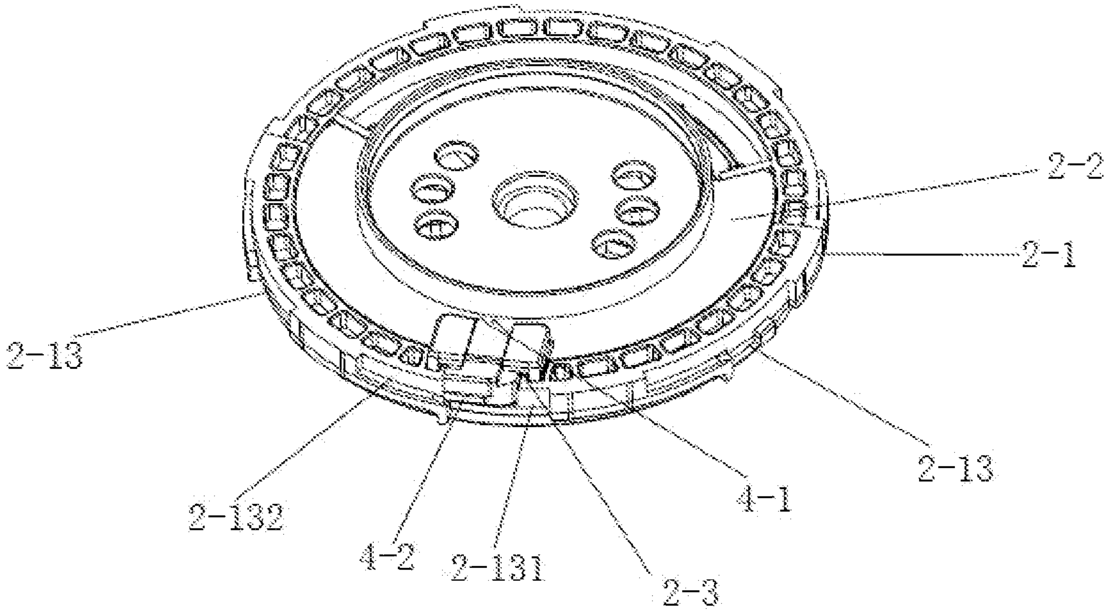
FIG. 7 is a schematic diagram of a water division assembly of an embodiment of the present invention at an angle.
Figure 8:
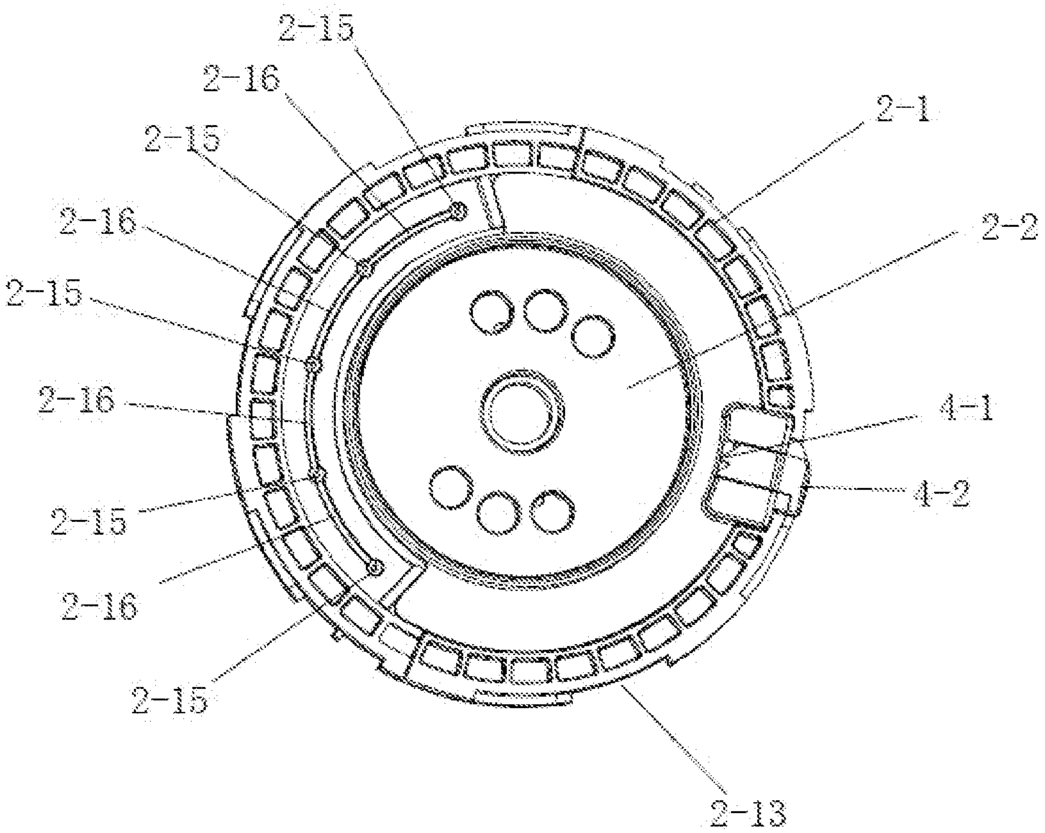
FIG. 8 is a schematic diagram of a water division assembly of an embodiment of the present invention at another angle.
Figure 9:
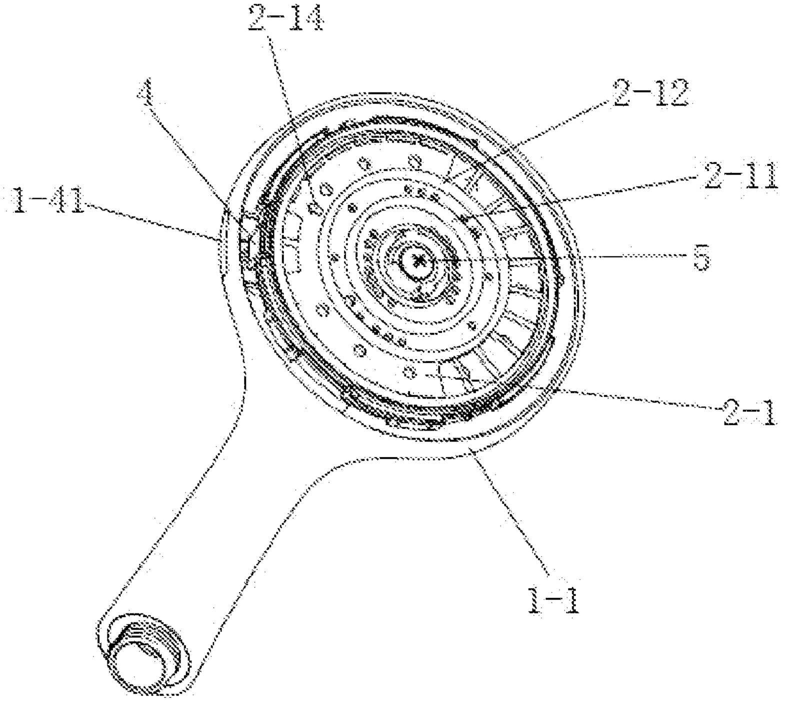
FIG. 9 is a structural schematic diagram of an embodiment of the present invention without a surface cover assembly.
Figure 10:
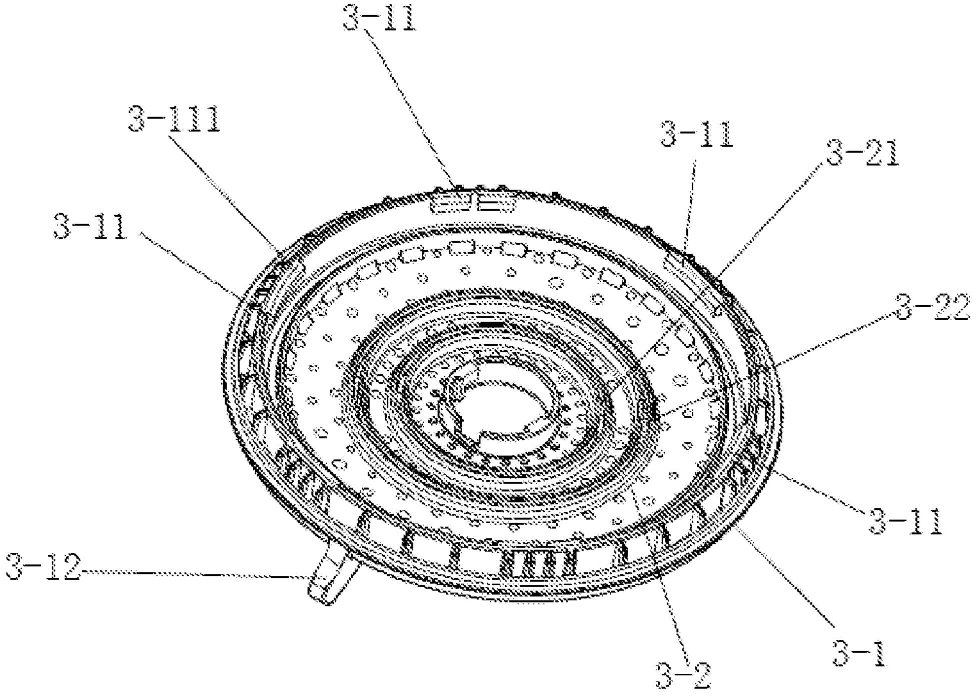
FIG. 10 is a structural schematic diagram of the surface cover assembly in an embodiment of the present invention.
Figure 11:
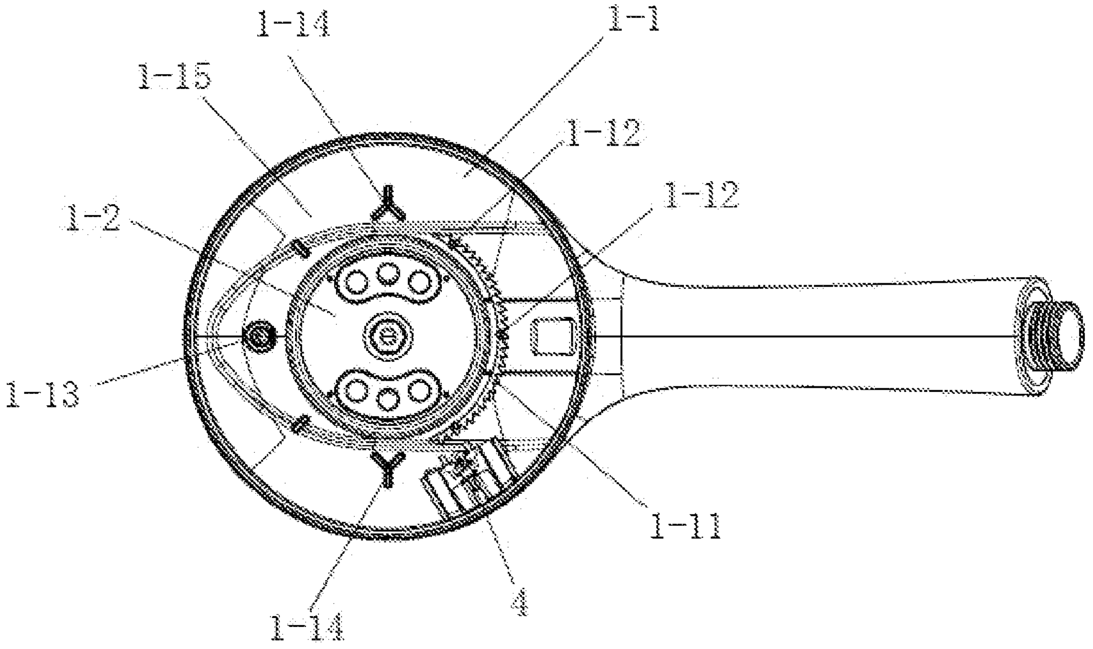
FIG. 11 is a structural schematic diagram of a body assembly of an embodiment of the present invention at an angle.
Figure 12:
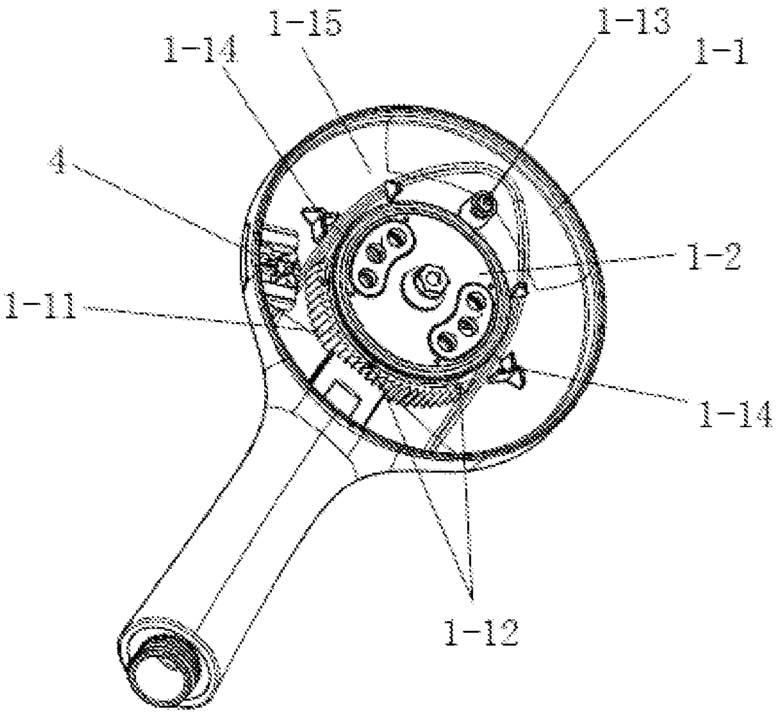
FIG. 12 is a structural schematic diagram of a body assembly of an embodiment of the present invention at another angle.
Figure 13:
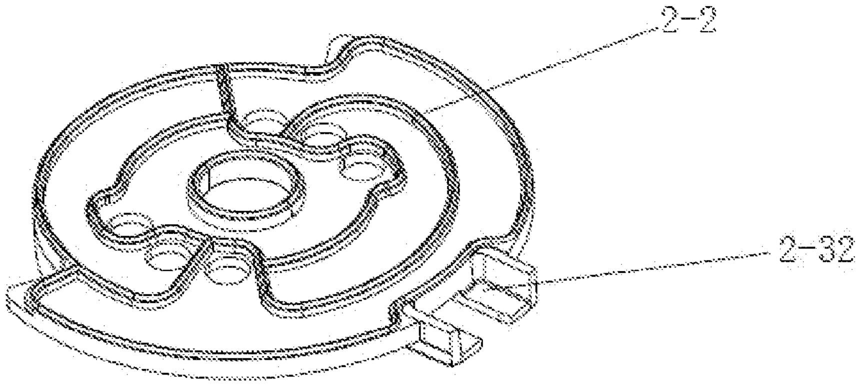
FIG. 13 is a structural schematic diagram of a water division body of one embodiment of the present invention.
Figure 14:
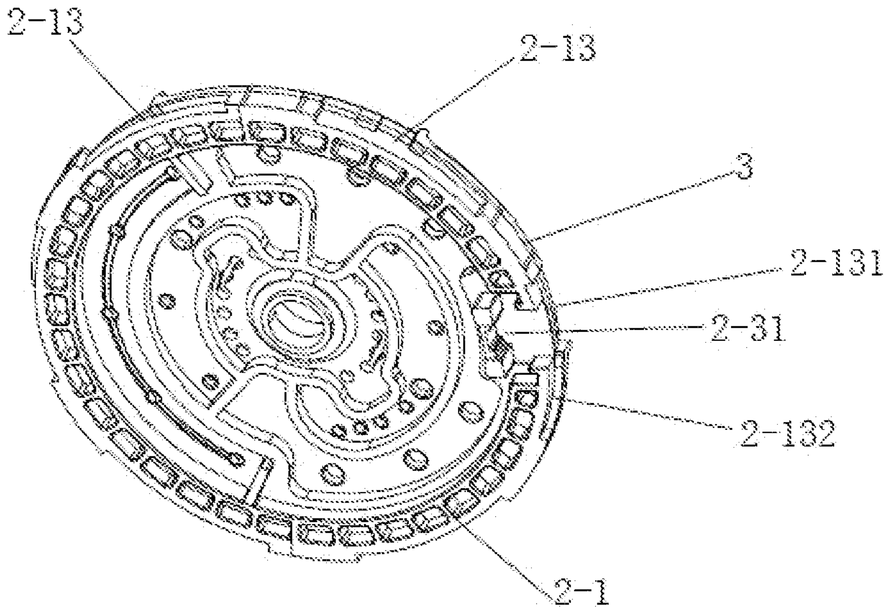
FIG. 14 is a structural schematic diagram of a water tilting body of an embodiment of the present invention.
Figure 15:
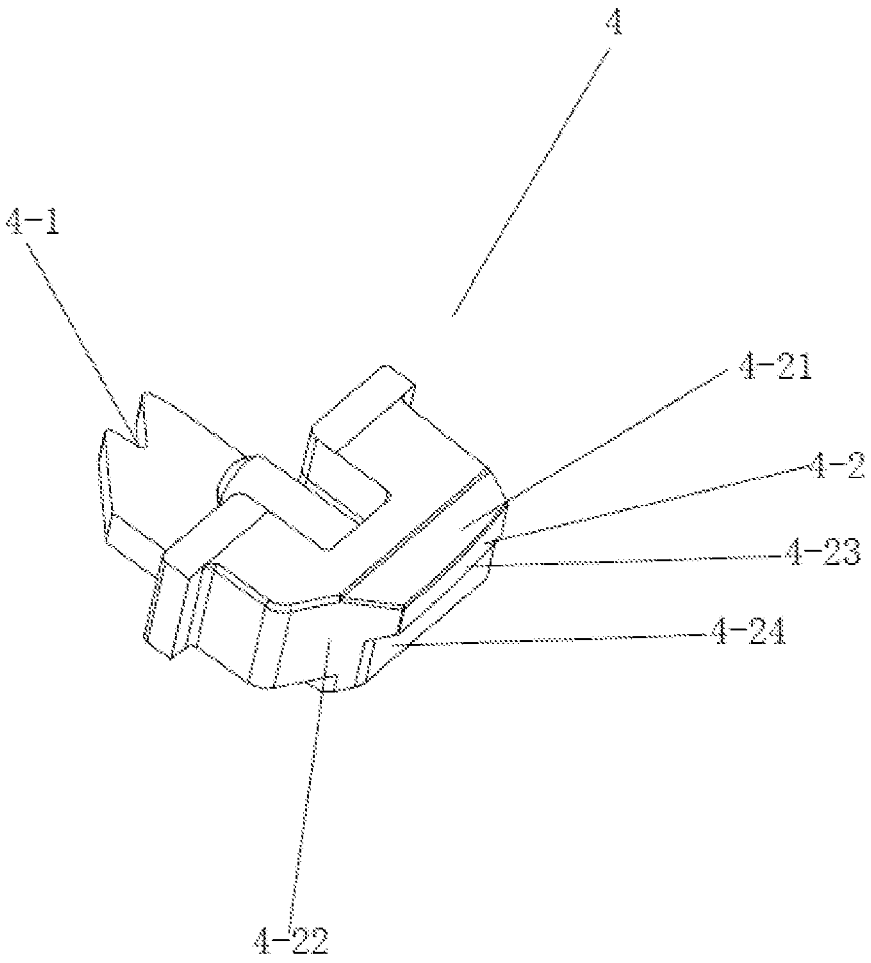
FIG. 15 is a structural schematic diagram of a locking and retaining part of an embodiment of the present invention.

As shown in FIG. 7, in the embodiment, each of the clamping grooves 2-13 includes an inlet groove 2-131 and a limiting groove 2-132 in an "L" shape, the locking and retaining part 4 is arranged at a bottom of the inlet groove 2-131 in a telescopic manner, the clamping jaws 3-11 are flush with inlet grooves 2-131 and are pressed downwards, and the clamping jaws 3-11 are in extruding fit with the blocking portion 4-2, so that the locking and retaining part 4 retracts, the clamping jaws 3-11 rotate to be clamped and limited to the limiting grooves 2-132, and then the blocking portion 4-2 retreats to block and limit the clamping jaws 3-11.

In the embodiment, the clockwise and anticlockwise directions take the position in the FIG. 1 as a reference. The surface cover assembly 3 is mounted by way of anticlockwise rotation and is detached by way of clockwise rotation. Of course, under other circumstances, it can further be mounted by way of clockwise rotation and detached by way of anticlockwise rotation with only correspondingly adjusting the structures of the clamping grooves 2-13.

In the embodiment, the surface of the water tilting body 2-1 is provided with the arrow mark 2-14; one side of the edge of the surface cover 3-1 is provided with a switching handle 3-12; and the arrow mark 2-14 corresponds to the switching handle 3-12, which facilitates rapid positioning and assembling.

In the embodiment, a top of the blocking portion 4-2 is a first tilted surface 4-21, a bottom of the clamping jaw 3-11 is a second tilted surface 3-111, and the first tilted surface 4-21 is in corresponding fit with the second tilted surface 3-111. According to the arrangement, the clamping jaw 3-11 and the blocking portion 4-2 are in extruding fit more smoothly, so that the shower head is assembled in a more labor-saving manner lightly. One side of the blocking portion 4-2 away from the limiting groove 2-132 is a third tilted surface 4-22. By arranging the third tilted surface 4-22, the end of the button slides into the blocking portion 4-2 for fit.

In the embodiment, the assembly chamber 1-15 of the body 1-1 is provided with a support frame 1-14; a plurality of support columns 1-12 extends at the top of the arc-shaped latch strip; the plurality of support columns 1-12 and the top end of the support frame 1-14 are located at the same level; and the support columns 1-12 are in fit with the support frame 1-14 for supporting the water division body 2-2.

Although the present invention is specifically exhibited and introduced in combination with preferred embodiments, those skilled in the art shall understand that various changes made on the present invention in form and detail without departing the spirit and scope of the present invention defined by the appended claims shall fall into the protection scope of the present invention.

The invention claimed is:

1. A shower head, comprising a body assembly, a water division assembly and a surface cover assembly, wherein the body assembly comprises a body provided with an assembly chamber; the water division assembly is rotatably mounted in the assembly chamber and comprises a water tilting body and a water division body arranged on an inner side of the water tilting body; the water tilting body is provided with a clamping groove; the surface cover assembly comprises a surface cover, wherein the surface cover is provided with a clamping portion, and the clamping portion is rotatably clamped to the clamping groove, so that the surface cover assembly is detachably mounted on the water division assembly; the water tilting body is provided with a locking and retaining part in a telescopic manner in a position corresponding to the clamping groove, wherein the locking and retaining part is provided with a locking portion and a blocking portion; the body assembly is provided with a locking and fitting portion, wherein the locking portion is in correspondingly fit with the locking and fitting portion to limit rotation of the water division assembly relative to the body; and the blocking portion is configured to limit a position of the clamping portion in the clamping groove so as to limit rotation of the surface cover assembly relative to the water division assembly; and wherein the clamping portion and the locking and retaining part are configured such that when the clamping portion is in fit with the blocking portion of the locking and retaining part in an extruding manner, the locking and retaining part retracts, so that the locking portion is in corresponding locking fit with the locking and fitting portion; and when the clamping portion rotates to be separated from the blocking portion of the locking and retaining part, the locking and retaining part retreats, so that the blocking portion limits the clamping portion in the clamping groove, and thus, the surface cover assembly is mounted on the water division assembly.

2. The shower head according to claim 1, wherein the locking and fitting portion is an arc-shaped latch strip arranged on the body; the locking portion is a latch head; and the latch head is in clamping and limiting fit with the arc-shaped latch strip.

3. The shower head according to claim 1, wherein the body is provided with an unlocking part in a telescopic manner; and the unlocking part and the locking and retaining part are configured such that when the unlocking part drives the locking and retaining part to retract, the locking portion of the locking and retaining part is in corresponding locking fit with the locking and fitting portion, and the blocking portion of the locking and retaining part releases the limitation on the position of the clamping portion in the clamping groove.

4. The shower head according to claim 3, wherein upper and lower sides of the blocking portion are respectively provided with a blocking convex surface and a yielding concave surface;

the unlocking part is in driving fit with the yielding concave surface; and the blocking convex surface is configured to limit the clamping portion in the clamping groove to limit rotation of the surface cover assembly relative to the water division assembly.

5. The shower head according to claim 3, wherein the inner side of the water tilting body is provided with a plurality of retaining slotted holes; the assembly chamber of the body is provided with elastic columns in corresponding fit with the retaining slotted holes to achieve water delivery gear switching and voice reminding; and the unlocking part is a button, and when a water delivery gear is located at an initiating end, the locking and retaining part is located between the locking and fitting portion and the button for unlocking fit.

6. The shower head according to claim 1, further comprising an elastic resetting part, wherein a position of the water tilting body corresponding to the clamping groove is provided with an upper accommodation groove; a position of the water division body corresponding to the clamping groove is provided with a lower accommodation groove; the upper accommodation groove and the lower accommodation groove are spliced to form an accommodation groove; and the locking and retaining part is arranged in the accommodation groove in a telescopic manner through the elastic resetting part.

7. The shower head according to claim 6, wherein the surface cover assembly further comprises a water delivery body; the water tilting body, the water delivery body and the surface cover fit each other to form a first annular water delivery channel, a second annular water delivery channel and a third annular water delivery channel distributed from inside to outside in sequence; an inner ring bump is formed between the first annular water delivery channel and the second annular water delivery channel corresponding to the water tilting body; an outer ring bump is formed between the second annular water delivery channel and the third annular water delivery channel corresponding to the water tilting body; the water delivery body is provided with an inner ring assembly groove and an outer ring assembly groove; the inner ring assembly groove is in seal fit with the inner ring bump; the outer ring assembly groove is in seal fit with the outer ring bump; and the surface cover is provided with a plurality of exhaust holes in communication with the inner ring assembly groove and the outer ring assembly groove.

8. The shower head according to claim 1, wherein a plurality of clamping grooves are provided at a peripheral edge of the water tilting body, the clamping portion is a clamping jaw, and a plurality of clamping jaws are arranged at a peripheral edge of the surface cover;

and each of the clamping grooves comprises an inlet groove and a limiting groove in an "L" shape, the locking and retaining part is arranged at a bottom of the inlet groove in a telescopic manner, and the clamping jaws and the limiting grooves are limited in a clamped manner.

9. The shower head according to claim 1, wherein a top of the blocking portion is a first tilted surface, a bottom of the clamping portion is a second tilted surface, and the first tilted surface is in corresponding fit with the second tilted surface.

10. The shower head according to claim 1, wherein the body assembly further comprises a fixed seat and a threaded joint; each of the fixed seat and the water division assembly penetrates through a screw at a center thereof and is mounted in the assembly chamber of the body, and the threaded joint is mounted and locked at a handle end of the body.

11. The shower head according to claim 10, wherein the fixed seat is fixedly arranged relative to the body, and the water division assembly is rotatably arranged relative to the fixed seat.

12. The shower head according to claim 5, wherein an arc-shaped guide groove is provided between every two adjacent retaining slotted holes of retaining slotted holes, the arc-shaped guide groove is configured to slidably guide each of the elastic columns.

13. The shower head according to claim 12, wherein a depth of each of the retaining slotted holes is greater than a depth of the arc-shaped guide groove.

14. The shower head according to claim 6, wherein a button hole is provided in a peripheral outer side of the body; an unlocking part of the body is arranged in a telescopic manner in the button hole through the elastic resetting part, an outer end surface of the unlocking part protrudes from the button hole, such that a button surface is formed.

15. The shower head according to claim 1, wherein a surface of the water tilting body is provided with an arrow mark, one side of an edge of the surface cover is provided with a switching handle; and the arrow mark corresponds to the switching handle.

16. The shower head according to claim 8, wherein one side of the blocking portion away from the limiting groove is a third tilted surface.

17. The shower head according to claim 1, wherein the assembly chamber is provided with a support frame; a plurality of support columns extend at a top of the locking and fitting portion.

18. The shower head according to claim 17, wherein the support columns and a top end of the support frame are located at a same level; and the support columns are in fit with the support frame, for supporting the water division body.

19. A shower head, comprising a body assembly, a water division assembly and a surface cover assembly, wherein the body assembly comprises a body provided with an assembly chamber; the water division assembly is rotatably mounted in the assembly chamber and comprises a water tilting body and a water division body arranged on an inner side of the water tilting body; the water tilting body is provided with a clamping groove; the surface cover assembly comprises a surface cover, wherein the surface cover is provided with a clamping portion, and the clamping portion is rotatably clamped to the clamping groove, so that the surface cover assembly is detachably mounted on the water division assembly; the water tilting body is provided with a locking and retaining part in a telescopic manner in a position corresponding to the clamping groove, wherein the locking and retaining part is provided with a locking portion and a blocking portion; the body assembly is provided with a locking and fitting portion, wherein the locking portion is in correspondingly fit with the locking and fitting portion to limit rotation of the water division assembly relative to the body; and the blocking portion is configured to limit a position of the clamping portion in the clamping groove so as to limit rotation of the surface cover assembly relative to the water division assembly; and wherein the locking and fitting portion is an arc-shaped latch strip arranged on the body; the locking portion is a latch head; and the latch head is in clamping and limiting fit with the arc-shaped latch strip.

20. A shower head, comprising a body assembly, a water division assembly and a surface cover assembly, wherein the body assembly comprises a body provided with an assembly chamber; the water division assembly is rotatably mounted in the assembly chamber and comprises a water tilting body and a water division body arranged on an inner side of the water tilting body; the water tilting body is provided with a clamping groove; the surface cover assembly comprises a surface cover, wherein the surface cover is provided with a clamping portion, and the clamping portion is rotatably clamped to the clamping groove, so that the surface cover assembly is detachably mounted on the water division assembly; the water tilting body is provided with a locking and retaining part in a telescopic manner in a position corresponding to the clamping groove, wherein the locking and retaining part is provided with a locking portion and a blocking portion; the body assembly is provided with a locking and fitting portion, wherein the locking portion is in correspondingly fit with the locking and fitting portion to limit rotation of the water division assembly relative to the body; and the blocking portion is configured to limit a position of the clamping portion in the clamping groove so as to limit rotation of the surface cover assembly relative to the water division assembly; and wherein the body is provided with an unlocking part in a telescopic manner; and the unlocking part and the locking and retaining part are configured such that when the unlocking part drives the locking and retaining part to retract, the locking portion of the locking and retaining part is in corresponding locking fit with the locking and fitting portion, and the blocking portion of the locking and retaining part releases the limitation on the position of the clamping portion in the clamping groove.

* * * * *